United States Patent [19]

Arino et al.

[11] 3,940,318

[45] Feb. 24, 1976

[54] PREPARATION OF A PRIMARY TARGET FOR THE PRODUCTION OF FISSION PRODUCTS IN A NUCLEAR REACTOR

[75] Inventors: Hirofumi Arino, New Windsor, N.Y.; Frank J. Cosolito, Ringwood; Kenneth D. George, Boonton, both of N.J.; Alfred K. Thornton, New Hampton, N.Y.

[73] Assignee: Union Carbide Corporation, New York, N.Y.

[22] Filed: Nov. 6, 1973

[21] Appl. No.: 413,319

Related U.S. Application Data

[62] Division of Ser. No. 100,918, Dec. 23, 1970.

[52] U.S. Cl. ..................... 204/1.5; 29/458; 176/14; 176/16; 423/2; 424/1
[51] Int. Cl. ...................... B01k 3/00; C01g 43/00
[58] Field of Search ...................... 204/1.5; 29/458

[56] References Cited
UNITED STATES PATENTS

| | | | |
|---|---|---|---|
| 3,243,352 | 3/1966 | Boudouresques | 176/67 X |
| 3,318,695 | 5/1967 | Goslee et al. | 176/67 X |
| 3,375,203 | 3/1968 | Hurley et al. | 204/1.5 X |
| 3,691,087 | 9/1972 | Hurley et al. | 204/1.5 X |

Primary Examiner—Leland A. Sebastian
Attorney, Agent, or Firm—William Raymond Moran

[57] ABSTRACT

A primary target for the production of fission products in a nuclear reactor, such as uranium or plutonium fission products, is comprised of an enclosed, cylindrical vessel, preferably comprised of stainless steel, having a thin, continuous, uniform layer of fissionable material, integrally bonded to its inner walls and a port permitting access to the interior of the vessel. A process is also provided for depositing uranium material on to the inner walls of the vessel. Upon irradiation of the target with neutrons from a nuclear reactor, radioactive fission products, such as molybdenum-99, are formed, and thereafter separated from the target by the introduction of an acidic solution through the port to dissolve the irradiated inner layer. The irradiation and dissolution are thus effected in the same vessel without the necessity of transferring the fissionable material and fission products to a separate chemical reactor. Subsequently, the desired isotopes are extracted and purified. Molybdenum-99 decays to technetium-99m which is a valuable medical diagnostic radioisotope.

3 Claims, 1 Drawing Figure

U.S. Patent   Feb. 24, 1976   3,940,318
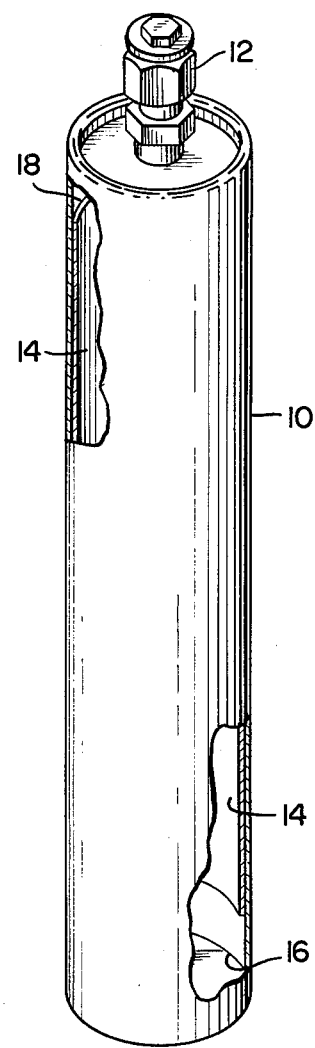

PREPARATION OF A PRIMARY TARGET FOR THE PRODUCTION OF FISSION PRODUCTS IN A NUCLEAR REACTOR

This is a division of application Ser. No. 100,918, filed Dec. 23, 1970.

This invention relates to a primary target useful for the production of fission products in a nuclear reactor. In one aspect, this invention relates to a primary target useful for the production of radioactive fission products such as $^{99}Mo$ in high concentrations and with a high degree of purity. In an additional aspect, this invention is directed to a primary target having a thin continuous, uniform layer of a fissionable material, integrally bonded to its inner walls and a port permitting access to the interior of the vessel. In another aspect, the invention is directed to a primary target which serves as the same vessel for irradiation and chemical dissolution. In a further aspect, the invention is directed to a process for depositing uranium material on the inner walls of the vessel.

Recent medical investigation has shown that $^{99}Tc^m$ is an extremely useful tool for diagnosis. High purity $^{99}Tc^m$ is used primarily as a radioisotope in a variety of medical research and diagnosis. It is well suited for liver, lung, blood pool and tumor scanning, and is preferred over other radioactive isotopes because of its short half-life which results in reduced exposure of the organs to radiation. In addition to medical uses, $^{99}Tc^m$ can also be employed in industrial applications, such as in the measurement of flow rates, process control, radiometric chemistry, and the like. Since the radioisotope sought to be used has such a short half-life, it is common practice to ship the users of the isotope the parent element; in this case radioactive molybdenum-99. The user then extracts the technetium from the molybdenum-99 as his needs require.

For medical diagnosis, radioactive $^{99}Tc^m$ is usually obtained from a generator containing the parent element. The generator is prepared by adsorbing $^{99}Mo$ on a column such as alumina. The column is then sent to a hospital where the physician washes the column and obtains the technetium-99m solution which is then administered to a patient orally or by intravenous injection. The technetium-99m localizes in brain, lung, liver, spleen, bone, and the like depending on the preparation of the $^{99}Tc^m$ solution. The exact location can then be detected by typical scanning. This technique which does not require an operation for diagnosis has become very popular in recent years and hence, the need for the $^{99}Tc^m$ generator is rapidly expanding.

The first $^{99}Tc^m$ generator was developed at Brookhaven National Laboratory. Uranium was irradiated in a reactor and the $^{99}Mo$ that was produced by nuclear fission process was separated by alumina chromatography. The purified $^{99}Mo$ was again adsorbed on an alumina column from an acidic medium and the $^{99}Tc^m$ in the column was recovered by dilute hydrochloric acid. This method, however, is currently not used for medicine because radionuclide purity of $^{99}Tc^m$ solution from the Brookhaven column is not considered high enough for medical use. It contained significant amounts of radioisotope impurities such as $^{103}Ru$, iodine isotopes, and the like.

More recently, as disclosed in U.S. Pat. No. 3,382,152, a medical $^{99}Tc^m$ generator was developed by using reactor irradiated molybdenum in place of the uranium target. When molybdenum is irradiated in a reactor, $^{99}Mo$ with a high degree of radionuclide purity is obtained by the $(n, \gamma)$ reaction. Furthermore, the chemical processing of the irradiated target is simple. This method is currently widely used by radiopharmaceutical manufacturers.

However, when the Mo target is irradiated in the reactor, only an extremely small portion of the Mo is converted to radioactive $^{99}Mo$ by the $(n, \gamma)$ reaction. Therefore, the specific activity of $^{99}Mo$, the ratio of $^{99}Mo$ activity to the total weight of elemental Mo, is small. Moreover, the active absorption sites on alumina are virtually consumed by inactive Mo, thus requiring a larger adsorption capacity to load a high $^{99}Mo$ activity. The specific activity of $(n, \gamma)$ $^{99}Mo$ is proportional to the neutron flux available in the reactor. Although several investigations have also been reported on adsorbents with a high adsorption capacity for Mo, the vast amounts of inactive molybdenum in this case adversely limits the activity of a $^{99}Tc^m$ generator.

Hence, for optimum use $^{99}Mo$ must be of an exceptionally high order of purity, and it should have a relatively high specific activity. As indicated above, one of the ways that has been studied for producing $^{99}Mo$ has been by irradiating uranium in a nuclear reactor. However, one of the problems that is encountered when producing $^{99}Mo$ in this manner is that more than 50 elements and more than 110 radioactive isotopes are formed by nuclear fission. Therefore, the recovery of any single radioactive species from such a mixture can be a formidable task. Methods that have been employed heretofore for recovering $^{99}Mo$ from irradiated uranium provide a yield product which often is not sufficiently pure for medical use because it contains significant amounts of radioactive iodine and ruthenium.

More recent attempts to prepare high specific activity readioactive materials by irradiation of uranium is to prepare a target comprised of uranium as an alloy in a sandwich plate of aluminum. Through irradiation of this sandwich, fission products containing the desired radioactive materials are generated. Through subsequent chemical dissolution and separations, the desired radioactive products are obtained in a relatively pure form.

However, the use of an aluminum sandwich plate as a matrix for the uranium presents serious disadvantages in the production technique. The need to dissolve the aluminum matrix in order to obtain the uranium requires a considerable period of time, for example, several hours of the production process. During this time the radioactive materials are decaying and therefore final product is being lost. Moreover, the presence of dissolved aluminum in the solution further complicates the separation steps and renders it difficult to obtain pure products. The relatively high volume of solution needed for the dissolution of the large mass of aluminum results in corresponding large volumes of radioactive waste solution which is difficult and expensive to dispose of. Hence this method requires a strict control of various parameters such as temperature and concentration and hence is slow and largely unsatisfactory. Moreover, the purity of the radioisotope molybdenum-99 obtained from this method is not always satisfactory for the current medical market.

Accordingly, it is an object of this invention to provide a novel primary target useful for the production of fission products in a nuclear reactor. Another object of this invention is to provide a primary target useful for the production of molybdenum-99 in high yields and having a high specific activity. A further object of this invention is to provide a target which is convenient to handle and from which the radioisotopes can readily be recovered. A still further object is to provide a process for the preparation of a primary target. These and other objects will readily become apparent to those skilled in the light of the teachings herein set forth.

In one aspect, the present invention is directed to a primary target for the production of fission products, such as uranium or plutonium, in a nuclear reactor and the process for its preparation. The primary target is comprised of an enclosed, cylindrical, stainless steel vessel, preferably having a thin, continuous, uniform layer of a fissionable material, integrally bonded to its inner walls and a port permitting access to the interior of the vessel. The primary target of this invention retains the advantage of the aluminum sandwich method, namely, good heat transfer, but avoids its disadvantages. The fissionable material is disposed as a thin layer, adherent to the inner surface of the cylindrical vessel. The small thickness of the layer which may be of the order of one-thousandth of an inch thick, and its intimate contact with the vessel results in good heat transfer from the deposit to the coolant that is in contact with the exterior surface of the vessel.

Through the use of the cylindrical vessel the irradiated material has its surface exposed for prompt and effective dissolution in the post-irradiation phase of the process. The dissolution solution can be introduced through the port in the volume needed to dissolve the irradiated material. Through suitable choice of solvent the deposit can be dissolved with little affect to the vessel itself. The large surface area exposed results in rapid dissolution, which may be only a few minutes, and therefore conserves processing time and avoids loss of product through radioactive decay. The resulting solution contains an insignificant quantity of dissolved vessel, which considerably simplifies the subsequent chemical processing and enables sophisticated separative methods to be used that result in highly-pure products.

With reference to the drawing, the single FIGURE shows a perspective view of the primary target 10 which is a cylindrical vessel closed at the bottom and top. The top is equipped with a port 12 permitting access to the interior of the vessel. The cutaway sections shown in the drawing permit observation of the layer of fissionable material 14 which is deposited on, and integrally bonded to the interior wall of the target. The layer extends from a predetermined length from points 16 to 18 along the inner wall of the vessel.

In practice, the target material can be comprised of most any metal or alloy to which the fissionable material can be bonded and subsequently chemically removed by acid treatment with little or no attack on the target vessel itself. For example, the primary target can be fabricated of stainless steel, nickel, nickel alloys, zirconium, zinc coated aluminum, and the like. Stainless steel, has been successfully employed as the target material and is the preferred choice. The walls of the target vessel must be smooth, free from any flaws. This ensures an intimate contact of the fissionable material with the inner walls of the vessel and optimum heat transfer to the coolant during exposure of the primary target to radiation.

Both the bottom and top of the primary target are sealed with stainless steel closures which are welded in place. The top closure is fitted with a port which can be sealed to provide an entirely closed system during exposure to the neutron source as well as at various stages during separation and recovery of the desired isotopes. The bottom and top closures, including the port and welded seals, must be at least the same integrity as the walls of the container in order to ensure a safe operation during radiation and subsequent processing.

In a preferred embodiment the primary target is fabricated from annealed, seamless, stainless steel tubing approximately 18 inches in length and having an outer diameter from 1 to 2 inches and a wall thickness of from about 0.03 to about 0.10 inches. The top is equipped with a port permitting access to the interior of the vessel. The port is composed entirely of metal, preferably stainless steel, and must be capable of withstanding the pressures and temperatures created during exposure of the primary target to neutrons. It has been observed that temperatures of up to about 300°C. are generated during irradiation. The primary target should be capable of withstanding temperatures of at least about 500°C. for at least one hour.

As hereinafter indicated, the primary target will contain a predetermined amount of fissionable material deposited on its inner wall. In practice, for an 18 inch primary target, of 1 inch diameter, it has been observed that a maximum of about 10,000 curies of radioactivity can be produced from a cylindrical uranium coating which is 15 inches in length and has a thickness of approximately 20 milligrams of uranium per square centimeter. Such deposits, weigh from about 7 to about 10 grams. Uranium thicknesses of up to about 50 milligrams per square centimeter for the same size primary targets have also been employed and are calculated to yield approximately 25,000 curies of radioactivity based upon a 15 inch coating of the length of the inner wall of a 1 inch outer diameter stainless steel tube. Such deposits weigh from about 18 to about 25 grams. In another aspect, the primary target serves as the same vessel for irradiation and chemical dissolution of the uranium.

In a further embodiment, the present invention is directed to a process for the deposition of the uranium material onto the inner walls of the primary target. In practice, the uranium can be deposited as uranium metal, uranium oxide, or in any other form as long as an adherent bond is formed with the inner walls of the target. It has been observed that uranium can be electrolytically deposited from an aqueous electrolytic bath containing uranium salts enriched in the fissionable isotope and chemical additives. The thickness of the deposit can be up to at least 50 milligrams per square centimeter. When subject to 500°C. for one hour or more in a nitrogen atmosphere, it was observed that the deposit maintained its adhesion and integrity even when subjected to severe vibrations.

As previously indicated, the preferred vessel material is seamless, stainless steel tubing in lengths of up to 18 inches and diameters of from one to two inches. The tube should be smooth, free from any flaws and have a thickness of from about 0.03 to about 0.10 inches. Prior to electrodeposition, the tube must be thoroughly cleaned with acid in order to ensure good bonding of the uranium to the stainless steel. This can be conveniently effected by stoppering one end of the tube with a rubber stopper, filling the tube with 25 per cent sulfuric acid at about 95°C., and allowing it to stand for at least 20 minutes. A second acid treatment may be employed if desired.

It has been observed that the preferential method to ensure optimum bonding of the uranium to the tube is to first deposit a thin layer on to the inner walls of the tube. This permits observation to assure that the electroplated uranium is adhering to the tube and also serves to obtain a tare weight of uranium-235. In practice, the layer deposited in this preplating stage, can be either uranium-235 or uranium 238. However, the remaining layer subsequently deposited is comprised of uranium-235.

The electrolytic bath employed both in the preplating and plating steps in an aqueous solution containing at least one uranyl compound in which the uranium has been enriched in uranium-235. A wide variety of uranyl compounds can be employed as long as they are soluble in water. Illustrative uranyl compounds include, among others, uranyl chloride, uranyl formate, uranyl nitrate, uranyl oxalate, uranyl sulfate, and the like. The pH of the bath is adjusted to a pH of from about 4 to about 9, and more preferable to a pH of 7.2.

The concentration of the uranyl compound in solution is not necessarily critical and can vary depending upon the time employed in electroplating. In practice, however, optimum results are obtained from an electrolytic bath comprised of 0.042 Molar $UO_2(NO_3)_2 \cdot 6 H_2O$ and 0.125 Molar $(NH_4)_2C_2O_4 \cdot H_2O$ which has been adjusted to a pH of 7.2.

After the tube has been treated with acid, it is rinsed with distilled water and placed in a vertical position in a water bath. A carbon anode is then inserted into the tube, centered, and fixed in place. A cathode electrical connector is placed over the outside diameter of the target and both anode and cathode connected to a power source. Electrolyte is introduced into the tube from the bottom and flows through the tube and out the top at a rate of from about 150 to about 180 milliliters per hour. The electrodeposition is conducted at a constant voltage of 1.5 volts and at a current within the range of from about 0.3 to about 1.0 amperes. Although electrodeposition can be effected at temperatures within the range of from about 50° to about 100°C., it is preferred to electrodeposit at the higher temperature. In practice when the water jacket surrounding the tube is maintained at 93°C. ± 1°C., excellent preplating is obtained in one hour at a current of 0.9 amperes. Upon completion of the preplating, the target is removed from the water bath, rinsed, dried and weighed. The preplated target can be stored indefinitely. The final plating of the uranium is done in a similar manner using the same apparatus employed in the preplating step. Care must be taken in inserting and removing the carbon anode so as not to damage the plated surface. When the bath temperature reaches 93°C. ± 1°C., electroplating is commenced at a current of 0.3 amperes. In order to minimize bubble formation and to achieve good bonding the current is cycled at 15 minute intervals starting with 0.3 amperes for 15 minutes, the current is increased to 0.6 amperes for the next 15 minutes, and then to 0.9 amperes for 15 minutes. The cycle is then repeated starting at 0.3 amperes. Electroplating is continued for a period of approximately 9 hours. Thereafter, the target is removed from the bath, washed and dried with forced hot air.

Each end of the tube is dipped in concentrated nitric acid at 35°C. to a depth of about 1½ inches for a few minutes. This removes the uranium deposit at the ends of the tube, leaving approximately 15 inches of plated area. After washing and drying, the target is heated in an oven at 500°C. for one hour under an inert atmosphere, such as nitrogen. The target is then sealed at both ends by welding a bottom and top closure to the tube.

After the primary target containing the uranium deposit has been sealed and carefully tested for leaks, it is then ready to be placed in the nuclear reactor. The primary target is then exposed to radiation in accordance with known techniques and employing the usual safeguards and controls. After exposure for approximately 100 to 200 hours the target is removed from the reactor and transferred to a facility for separation and processing of the fission products.

Although the electrodeposition process of this invention is particularly applicable to the preparation of primary targets having cylindrical configurations, it can also be employed to electrodeposit uranium onto metals of other shapes. For example, flat plates of stainless steel or other metals can be plated with uranium by this process.

Other methods can also be employed, if desired, to deposit the fissionable material, i.e., uranium or plutonium, onto the inner walls of the vessel. For example, the metal can be sputtered, ion plated, or evaporated, onto metal surfaces by known techniques.

The following examples are illustrative:

EXAMPLE I

Preparation of Primary Target

An 18-inch long tube of 1 inch outer diameter and constructed of annealed, seamless No. 304 stainless steel tubing (MIL-T-8504A specification) was cleaned in sulfuric acid solution and washed. Uranium enriched to 93% in $^{235}U$ was electroplated over a 15-inch length inside the capsule in the form of a uniform thin film of uranium oxide. The electroplating was effected by first preplating a thin-film or uranium onto the inner surface of the tube from an aqueous bath containing 0.042 molar uranyl nitrate and 0.125 molar ammonium oxalate, the pH having adjusted to 7.2 with $NH_4OH$. Electrodeposition was effected for 60 minutes at a current of 0.9 amperes, 1.5 volts; and a temperature of 93° ± 1°C. Thereafter, the cylinder was removed from the plating assembly, washed with water, dried, and weighed. The final uranium deposit was made from a similar electrolytic bath as that used in the preplating step. The temperature employed was 93° ± 1°C. and a fixed voltage of 1.5 volts. The current was cycled by means of a clock mechanism starting with 0.3 amperes, 0.6 amperes, then 0.9 amperes, then 0.3 amperes, etc. every 15 minutes. The electrolyte was circulated through the cylinder at a flow rate of 200 milliliters per hour. The electrodeposition rate was approximately 1.2 grams uranium oxide per hour. After about 8 hours, the cylinder was removed from the plating assembly, washed and dried. The ends of the cylinder were dipped in nitric acid to remove about 1½ inches of the uranium deposit to give an arbitrarily selected length of 15 inches of uranium deposit in the tube. The resulting film thickness was 20 mg $^{235}U$ per $cm^2$ of tube surface, for a total deposit of 7 gm $^{235}U$. The total uranium mass was determined gravimetrically. The plated tube was then baked at 500°C. in nitrogen. The adherence of the film was checked with a vibration test. The film remained adherent despite temperature cycling between room temperature and 500°C.; the latter being well above the expected radiation temperature of 330°C. Tubes plated with uranium have been temperature-cycled and vibrated with less than 1 percent of the film appearing as loose powder granules.

The two end caps of the tube were heliarced in place. The swage-type fittings that comprise the capsule seal and entry port are No. 316 S/S. The maximum allowable internal working pressure is 900 psi (ASME Code for Class B nuclear vessel at 340°C.).

The plated vessel was then filled to about one atmosphere of helium, sealed, and then leak-tested with a mass-spectrometer-type leak detector. The maximum permissible leak is $10^{-8}$ scc/sec. The integrity of the stainless steel seal plug (and the welds) has been verified up to 250 hours at 300°C., and in short-duration tests at 500°C., and also in the 214 hour Instrumented Target Experiment during which the radiation monitoring system indicated no primary capsule leakage.

EXAMPLE II

Irradiation and Recovery of Molybdenum-99

The reactor irradiation assembly employed was comprised of a sealed primary capsule containing uranium-235 and enclosed within a close-fitting secondary container. Heat generated in the primary was conducted through the narrow gas-gap between it and the secondary. Gas lines entering the top and bottom of the secondary allowed a helium atmosphere to be established within the container and a slow sweep of gas to be taken to monitoring equipment located on the reactor bridge. Pressure, flowrate, and radioactivity of the gas were monitored. Exit gas was filtered before venting into the reactor-building exhaust duct via a solenoid-controlled shutoff valve. The secondary container was centered in a stringer tube within the reactor core and was cooled by primary water flowing in the annulus so formed. The assembly was designed to contain about 400 curies of $^{99}$Mo at removal from the reactor.

The primary target capsule, as prepared in Example I above, was then placed in a secondary capsule which was fabricated from No. 304 stainless steel sanitary tubing. A lead weight was provided for ease in placement and for ensuring that the assembly would not float in water. Two gas lines (¼ and ⅛ inc. OD No. 304 S/S) were provided, one in the top cap and one near the lower end of the capsule. These lines supplied the helium gas which served as the heat-transfer medium between primary and secondary necessary for limiting the primary temperature to the design value of 330°C.

The upper end-cap consisted of a stainless steel "CAJON" type VCO coupling TIG-welded to the capsule body. This coupling employed a silver-plated stainless steel O-ring for its seal. The O-ring was discarded after use. All welds and penetrations in the secondary capsule body were helium leak-checked.

The secondary capsule containing the primary target capsule was placed in a core stringer tube. This aluminum (No. 6061) tube provided the 0.25 inch gap needed for the desired cooling water speed of 3.5 ft/sec past the secondary capsule. Primary reactor cooling water with normal gravity flow was used. Measurements in a test stand showed that at least 3.9 ft/sec is obtained.

The stringer tube, containing the secondary and primary target, was then lowered into a nuclear reactor and irradiated at a neutron flux of $3 \times 10^{13}$ n/cm²sec.

for 100 hours. Thereafter, the primary target was removed to a hot cell facility, the swage-type fitting opened and the primary target connected to a self-sealing entrance port. The uranium oxide was dissolved by introducing though the port a mixture of 15 cc of concentrated $H_2SO_4$ and 60 cc of 10 per cent $H_2O_2$. Any off gases in the primary target were trapped in a liquid nitrogen cooled trap. The mixed fission product solution was passed through an $^{99}$Mo adsorption column (1 cm × 5 cm) containing 2 cc of silver-coatedcharcoal (20–50 mesh) and 2 cc of charcoal. The column was washed with 60 cc of dilute sulfuric acid and 60 cc of water successively. The $^{99}$Mo retained in the column was eluted with 40 cc of 0.2 M NaOH. The eluant was passed through another purification column that contains 2 cc of silver-coated-charcoal at the upper part of the column and 2 cc of zirconium phosphate at the bottom. To the $^{99}$Mo product solution thus obtained, 5 cc of HCl was added to make the $^{99}$Mo solution isotonic saline solution. The solution contained about 100 curies of $^{99}$Mo. A 0.1 cc portion of the $^{99}$Mo-isotonic saline solution was added to a Woelm alumina column (0.6 × 3 cm) and the column was washed with isotonic saline solution. The adsorption of $^{99}$Mo was >99.999 per cent. The $^{99}$Tc$^m$, after it accumulated in the column, was eluted with 10 cc of isotonic saline solution and recovered >90 per cent. The $^{99}$Mo content in the $^{99}$Tc$^m$ eluant was in the order of $10^{-4}$ percent. No other radioactive contaminants were detected either by a GeLi or NaI (Tl) crystal coupled with a gamma-ray analyzer. The alumina breakthrough in the $^{99}$Tc$^m$ eluant was very small, <1 ppm. The total heavy metal content was <1 ppm.

Although the invention has been illustrated by the preceeding examples, it is not to be construed as being limited to the materials employed therein, but rather the invention is directed to the generic area as hereinbefore disclosed. Various modifications and embodiments can be made without departing from the spirit and scope thereof.

What is claimed is:

1. A process for the preparation of a primary target for the production of fission products in a nuclear reactor, said target being comprised of (a) an enclosed metallic cylindrical vessel sealed at its top and bottom, (b) means for permitting access to the interior of said vessel, and (c) a thin, continuous, uniform layer of a fissionable uranium material, integrally bonded to the inner cylindrical walls of said vessel, said process comprising the steps of:
   a. electrodepositing a uranium material onto the inner cylindrical walls of said vessel by electrolyzing a system comprised of:
      i. an anode,
      ii. said vessel as the cathode,
      iii. an aqueous electrolytic bath containing at least one uranyl salt enriched in uranium 235 and having a pH of from about 4 to about 8 said electrolyzing being effected at a temperature of from about 50° to about 100°C; and at a current which is periodically and sequentially cycled from about 0.3 to about 0.6 to about 0.9 amperes, and
   b. sealing said top and bottom of said vessel.

2. The process of claim 1 wherein said uranyl salt is uranyl nitrate.

3. The process of claim 1 wherein said uranyl salt is uranyl sulfate.

\* \* \* \* \*